UNITED STATES PATENT OFFICE.

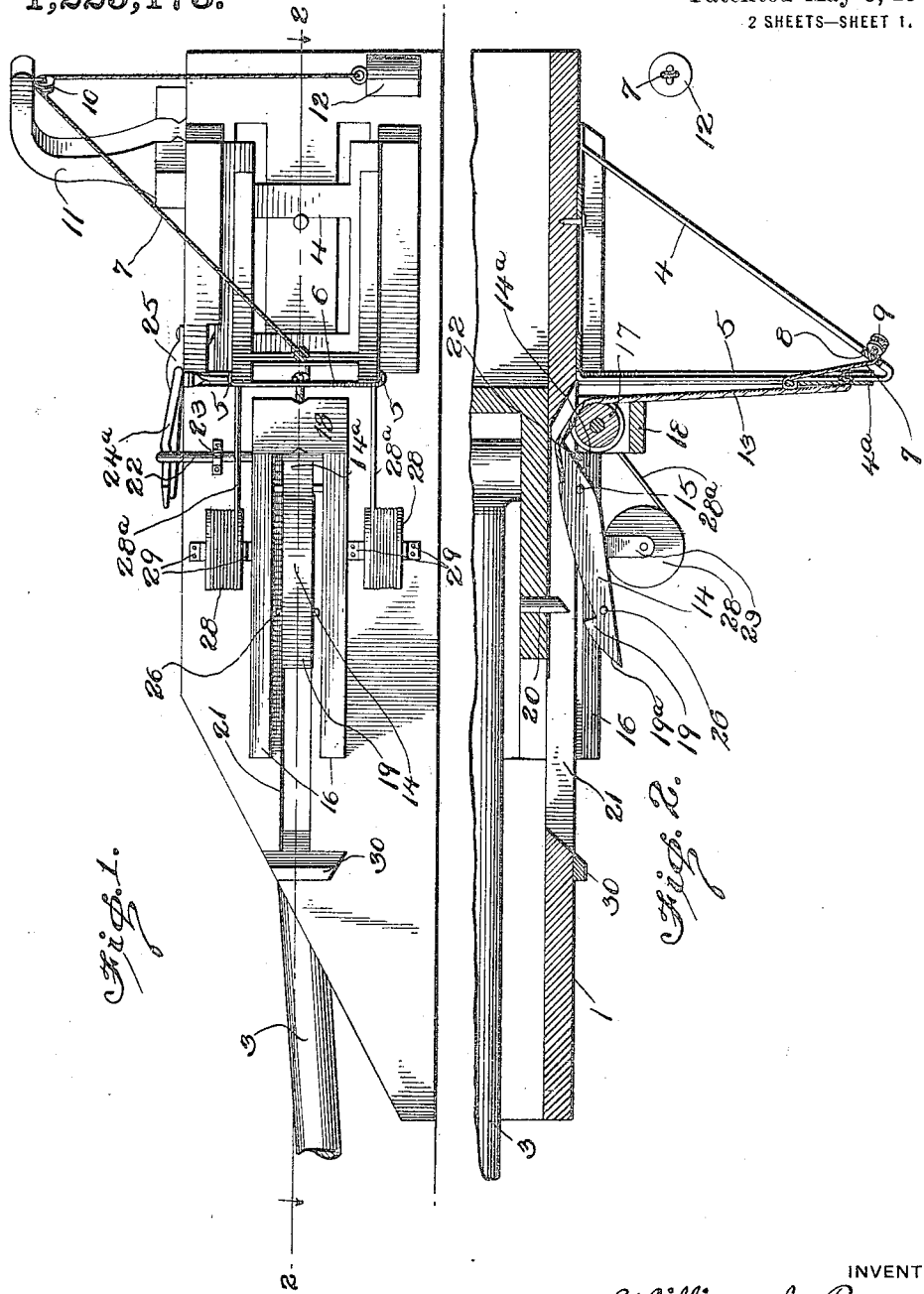

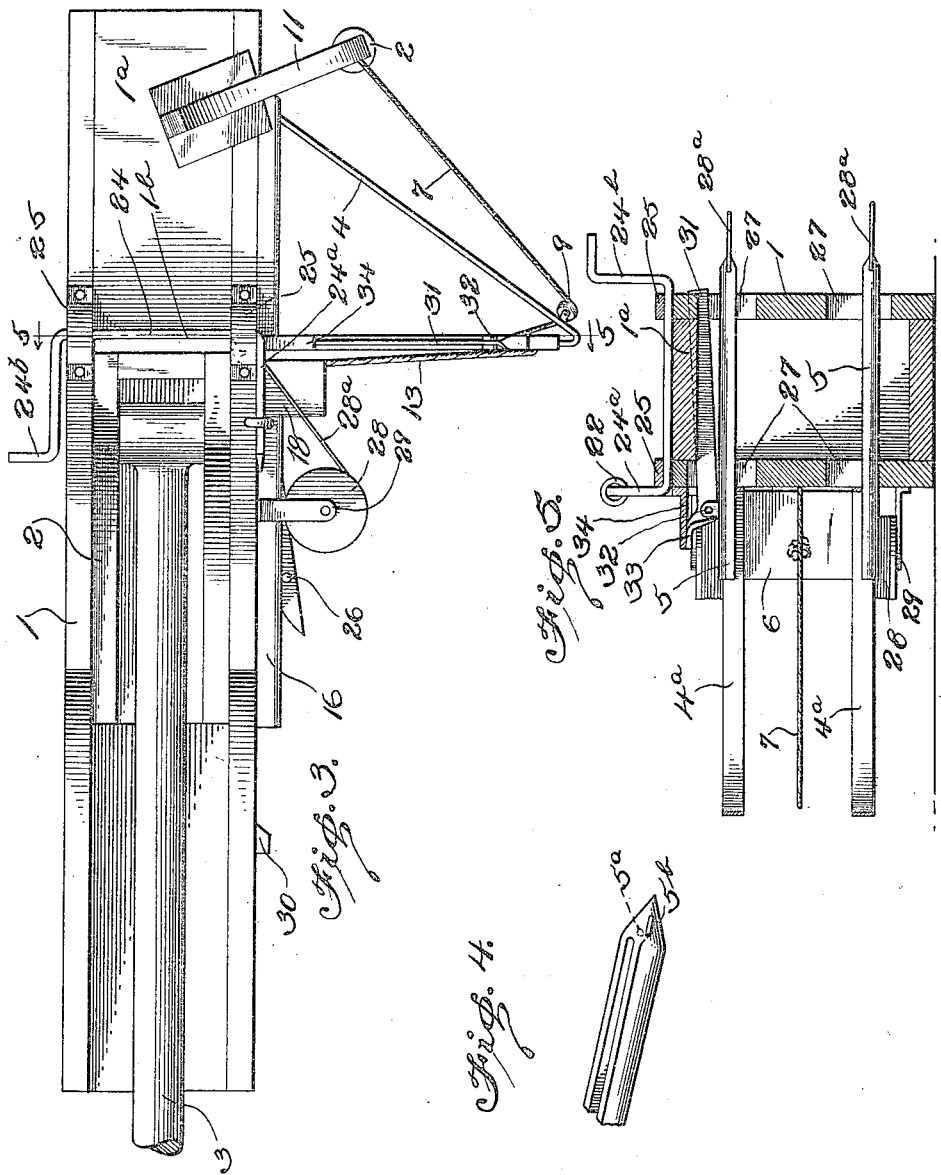

WILLIAM J. RAY, OF FORT SMITH, ARKANSAS.

BALE-TYING MECHANISM.

1,225,173.

Specification of Letters Patent.

Patented May 8, 1917.

Application filed June 10, 1916. Serial No. 102,953.

*To all whom it may concern:*

Be it known that I, WILLIAM J. RAY, a citizen of the United States, residing at Fort Smith, in the county of Sebastian and State of Arkansas, have invented certain new and useful Improvements in Bale-Tying Mechanism, of which the following is a specification.

This invention relates to bale tying mechanism, and more particularly to means mounted on a hay baling machine for moving the tying medium across the path of the bale being formed so as to be in such a position as to render it possible to quickly and easily secure the bale after the same has been formed.

One of the main objects of the invention is to provide a mechanism of the character stated of simple construction and operation. A further object is to provide a mechanism which can be quickly and easily applied to a standard hay baler. Further objects will appear from the detailed description.

In the drawings:—

Figure 1 is a side view of a baler with the invention applied,

Fig. 2 is a fragmentary section on line 2—2 of Fig. 1,

Fig. 3 is a plan view,

Fig. 4 is a detail, and

Fig. 5 is a section on line 5—5 of Fig. 3.

1 designates the usual casing of rectangular cross section in which is reciprocally mounted a plunger head 2 operated by a shaft 3 driven from a crank of a horse power, or other suitable motor, in the usual manner. On one side of this casing I mount the triangular bracket 4, the inner horizontal arms $4^a$ of which are in vertical alinement. On each of the arms $4^a$ a needle 5 of U-shape cross section is slidably mounted. These needles are connected by a cross head 6 to which is secured a cable 7. This cable passes through an opening in the brace bar 8, over the guide pulley 9 secured to the brace arm, over a second pulley 10 carried by the bracket arm 11 secured to the top of the casing 1, and has a weight 12 secured to its other end. This weight normally acts to hold the head 6 and the needles 5 in their outermost position. A second cable 13 is secured to the head 6 and has its inner end secured to a latch lever 14 pivoted on a pin 15 operating in guides 16 secured to the side of the casing 1. This cable passes about a guide pulley 17 mounted on the side of the casing in a bracket 18. The inner end of lever 14 is extended beyond the pin 15 and is beveled inwardly as at $14^a$, for a purpose to be later disclosed. As will be clear from Fig. 2 of the drawings, the weight 12 exerts tension on the cable 13 which acts to force the hooked head 19 of the latch lever inwardly, the cable exerting pressure on the inner end of the lever. This latch lever coöperates with an outwardly and rearwardly beveled lug 20 carried by the plunger head 2. This lug operates in a slot 21 through the side of the casing 1 and is adapted to be engaged by the latch lever when in its innermost position, when the lever is in operative position. Normally the latch lever is held out of operative position by means of a vertically slidable rod 22 which is slidable through the guide bracket 23 secured to the side of the casing and is loosely connected at its upper end to the crank arm $24^a$ of a crank lever 24 rockably mounted in bearings 25 and provided at its other end with an operating crank $24^b$. By rocking the lever 24 downwardly the rod 22 is moved into position to engage the beveled inner end $14^a$ of the latch lever so as to hold the head 19 thereof outwardly, as in Fig. 2. When the rod 22 is raised to inoperative position, the latch lever is rocked by means of the weight 12 and cable 13 into operative position, so that the head 19 thereof projects into the slot 21. The inward movement of the head of this lever is limited by means of a short transverse pin 26 secured therethrough and adapted to engage the side wall of the casing adjacent the edges of the slot. In this position, when the plunger head is moved forward, the head 19 of the latch lever will engage the beveled lug 20 thus locking the lever to the plunger head. When the plunger head is moved outward the latch lever will be moved with it. This will force the head 6 and the needles 5 inwardly transversely of the casing 1, by means of cable 13. For this purpose the casing is provided with slots 27 through each side thereof through which the needles operate.

The weight 12 acts through cable 13 to return the latch lever 14 to its initial position after this member has been released from the plunger head. In addition, the cable is so connected to the latch lever as to exert outward pressure on the inner end thereof thus normally forcing the head 19 of the latch lever toward the plunger head. By this arrangement, the means for returning the latch lever to its initial position also acts to move this member inward into engagement with the plunger head, thus doing away with the necessity of employing springs or the equivalent for moving the latch lever head into engagement with the plunger head. This produces a very simple and efficient structure composed of a minimum of parts and eliminates all danger of breakage or disengagement such as is present in devices where the latch lever is forced toward the plunger head by a spring or the equivalent. Also, the latch lever is connected directly to the needles so as to be returned to its initial position when the needles are moved outward, and to force the needles inward when the latch lever is moved outward, the cable 13 providing a simple and direct connection between the needles and latch lever and eliminating all unnecessary elements such as crank arms, levers, and the like, which are often employed in mechanisms of this sort.

Two wire reels 28 are rotatably mounted in brackets 29 on the side of the casing 1. The wire 28$^a$ to be used for tying the bale is taken from these reels and threaded through the needles 5. For this purpose each of the needles is provided with an aperture 5$^a$ through one side and a slot 5$^b$ through its end. The wire is inserted through the aperture and then led through the slot. When the needles are moved inward transversely of the casing 1, as in Fig. 5, the wire from each of the reels is also moved across the casing. The ends of this wire are held firmly and the needle head 6 is released by tripping the latch lever 14 so as to be returned to its initial position by the weight 12. This leaves the two wires extending across the casing near the top and bottom thereof in suitable position to be engaged by the end of the bale being formed.

In using my device, assuming that a bale has been previously formed in the baling chamber at the outer end of the casing and properly tied, I lift the tripping rod 22 so as to permit the latch lever 14 to move into engagement with the lug 20 carried by the plunger head. This locks the plunger head and latch lever together so that, on its rearward movement, the plunger head draws the latch lever along with it. This operates the needle head 6 so as to move the needles 5 and the wires carried thereby across the baling chamber. This operation is complete slightly before the plunger head reaches the end of its rearward stroke. When the plunger head reaches the end of its rearward stroke the beveled inner face 19$^a$ of the head 19 of the latch lever 14 engages the beveled tripping block 30 secured to the side of the casing at the outer end of slot 21. This block operates to release the latch lever from the plunger head, and the weight 12 acts through cable 13 to return the same to its innermost position. After the tripping rod 22 has been raised, as above described, it is at once released so that it returns by gravity to its operative position. When the latch lever 14 is returned to its normal position the beveled face 14$^a$ at the inner end thereof, engages the rod 22 so that the latch is rocked into inoperative position, as in Fig. 2.

The bale which has been previously formed in the baling chamber acts as a sufficient head or stop for the forming of the second bale. As the second bale is formed the first bale is gradually forced out of the baling chamber and, at the same time, the two wires which extend across the chamber in front of the second bale, are drawn outwardly, the wire being taken from the reels 28. When the second bale has been completed, the needles 5 are moved across the casing as before so as to carry the wires across the inner end of the bale. The wires are then cut off a short distance from the ends of the needles, the proper amount of wire for tying being drawn through the needles before making this cut. The ends of each of the wires which have been cut from the needles are then drawn tightly together and secured by twisting, in the usual manner. This firmly secures the second bale which then acts in the same manner as the first bale as an abutment or head for forming the third bale. This third bale is tied in the same manner as the second one, the operation being practically continuous, each successive bale acting to force the preceding bale out of the casing and being tied when completed, as previously described. In order to operate the needles for tying a bale, it is only necessary to rock the shaft 24 so as to raise the tripping rod 22 and then release it, the operation of the other elements of the tying mechanism being automatic.

To form the first bale, a suitable head or partition may be temporarily mounted in the baling chamber and the two tying wires passed in front of this head by means of the needles 5. Of course, the initial bale may be formed in any other suitable manner.

When the bale has been completed there is a certain amount of hay which will project above the upper edge of the plunger head 2, thus forming a ragged and rough edge. In order to form a neat bale, it is necessary that this edge be removed. I accomplish this by pivotally mounting a cutting knife 31 between two ears 32 carried by the upper needle 5. The upper edge of this knife is bent at right angles, to form an arm 33. This arm is adapted, when the needles have been moved to their innermost position, to engage the angle bracket 34 secured on the side of the casing so as to force the cutting edge of the knife upward. This cutting edge operates against the inner edge 1$^b$ of the top wall 1$^a$ of the baling chamber and serves to completely sever from the body of the bale all straws projecting over the plunger head 2. At the same time, the needles act to carry the wires across the casing in front of the succeeding bale, as previously described.

There may be slight variations made in the construction and disposition of the various parts of my invention without departing from the field and scope of the same, and I intend to include all such variations as fall within the appended claims in this application, in which a preferred form only of the invention is disclosed.

What I claim, is:—

1. In a mechanism of the character stated, the combination of a casing, a plunger head operable therein, slidably mounted needles operable transversely of the casing, a slidably and pivotally mounted latch lever connected to the needles and optionally connectible to the plunger head, connections between said needles and latch lever for moving the needles inward across the casing when the latch lever is moved outward longitudinally of the casing, said connections being adapted to also rock the lever inward about its pivotal axis toward the head, a member carried by the plunger head and engageable by said latch lever so as to operatively connect the same to said head when the latch lever is rocked inward, means for normally holding the needles in their outermost position and the latch lever in its innermost position and for returning said needles and latch lever to their initial positions, and means for normally holding the latch lever in inoperative position.

2. In a mechanism of the character stated, the combination of a casing, a plunger head operable therein, a plurality of slidably mounted needles movable transversely of the casing, means for normally holding said needles in their outermost position and for returning them to this position when moved inward transversely of said casing, a pivotally and slidably mounted latch lever connected to said needles and optionally connectible to the plunger head, means for automatically moving the latch lever into inoperative position and for maintaining it in this position, connections between the latch lever and the needles for moving the needles inward transversely of the casing when the latch-lever is moved outward longitudinally of the casing, said connections being adapted to also normally rock said lever inward toward the plunger head, a member carried by said plunger head and engageable by the head of said latch lever so as to operatively connect the plunger head and latch lever when the latch-lever is rocked inward, and means for automatically tripping the latch lever and releasing it from the plunger head at the end of the outward stroke of said head.

3. In hay presses, a casing, a plunger head operable in said casing, a latch-lever slidably mounted on the casing and pivoted intermediate its ends for movement toward and away from the casing, a member carried by the plunger head and engageable by the head of said latch-lever so as to operatively connect the lever and head, a pair of slidably mounted needles movable transversely of the casing, means for normally holding said needles in their outermost position and for returning them to this position when moved inward, and a cable secured at one end to said latch-lever so as to exert outward pressure thereon in back of the pivotal axis thereof and force the head of said latch-lever inward of the casing, the other end of said cable being secured to said needles whereby the needles are moved inward of the casing when the latch-lever is moved outward longitudinally of the casing by the plunger head, and the latch-lever is moved inward into its initial position when the said needles are moved outward.

4. In hay presses, a casing, a plunger head operable therein, a laterally projecting lug carried by the head, said casing being provided with a slot to accommodate movement of the lug longitudinally of the casing, a latch lever slidably and pivotally mounted on the casing and having an inwardly directed head at its outer end operable through said slot adapted to engage over said lug, the pivotal axis of said latch lever being intermediate the ends thereof, a bracket mounted on the casing, a pair of needles slidably mounted on said bracket for movement transversely of the casing, means for normally holding the needles in their outermost position, a guide pulley mounted on said casing adjacent the needle supporting bracket, and a cable passed about said pulley and secured at one end to the latch-lever so as to exert outward pressure on the inner end thereof, the other end of said cable being secured to said needles.

In testimony whereof I affix my signature in presence of a witness.

WILLIAM J. RAY.

Witness:
  M. E. JONES.

Copies of this patent may be obtained for five cents each, by addressing the "Commissioner of Patents. Washington, D. C."